United States Patent

[11] 3,628,068

[72] Inventors Thomas F. Long
 Warminster;
 Elliott L. Ressler, Elkins Park; Henry R. Beyer, Chalfont, all of Pa.
[21] Appl. No. 49,757
[22] Filed June 25, 1970
[45] Patented Dec. 14, 1971
[73] Assignee The United States of America as represented by the Secretary of the Navy

[54] SEQUENTIAL TIMING SYSTEM
 8 Claims, 3 Drawing Figs.
[52] U.S. Cl. ................................................. 307/293,
 307/246, 328/67, 328/75, 328/78, 328/87
[51] Int. Cl. ....................................................... H03k 17/28
[50] Field of Search ........................................... 307/246,
 293; 328/55, 67, 72, 75, 78, 87, 99

[56] References Cited
UNITED STATES PATENTS

| | | | |
|---|---|---|---|
| 3,210,613 | 10/1965 | Prapis............................ | 307/293 |
| 3,431,471 | 3/1969 | Aviander....................... | 307/293 |
| 3,496,389 | 2/1970 | Zegarski et al. .............. | 307/293 |
| 2,906,926 | 9/1959 | Bauer............................ | 307/293 |
| 2,942,123 | 6/1960 | Schuh, Jr. ..................... | 307/293 |
| 3,131,318 | 4/1964 | Snyder et al. ................. | 307/293 |

Primary Examiner—Donald D. Forrer
Assistant Examiner—R. C. Woodbridge
Attorneys—R. S. Sciascia and Henry Hansen ABSTRACT: Battery power is sequentially applied in fixed time intervals to a plurality of loads requiring differing stabilizing periods. The network supplying the power comprises a plurality of timers and switches sequenced and operated so that upon receiving an actuating signal the battery power is removed. The system is also operable in an additional mode that sequentially transmits the power to the plurality of loads for a fixed period of time by inhibiting the actuating signal.

Patented Dec. 14, 1971

INVENTORS
THOMAS F. LONG
ELLIOTT L. RESSLER
HENRY R. BEYER

BY

*Henry Bauer*

ATTORNEY

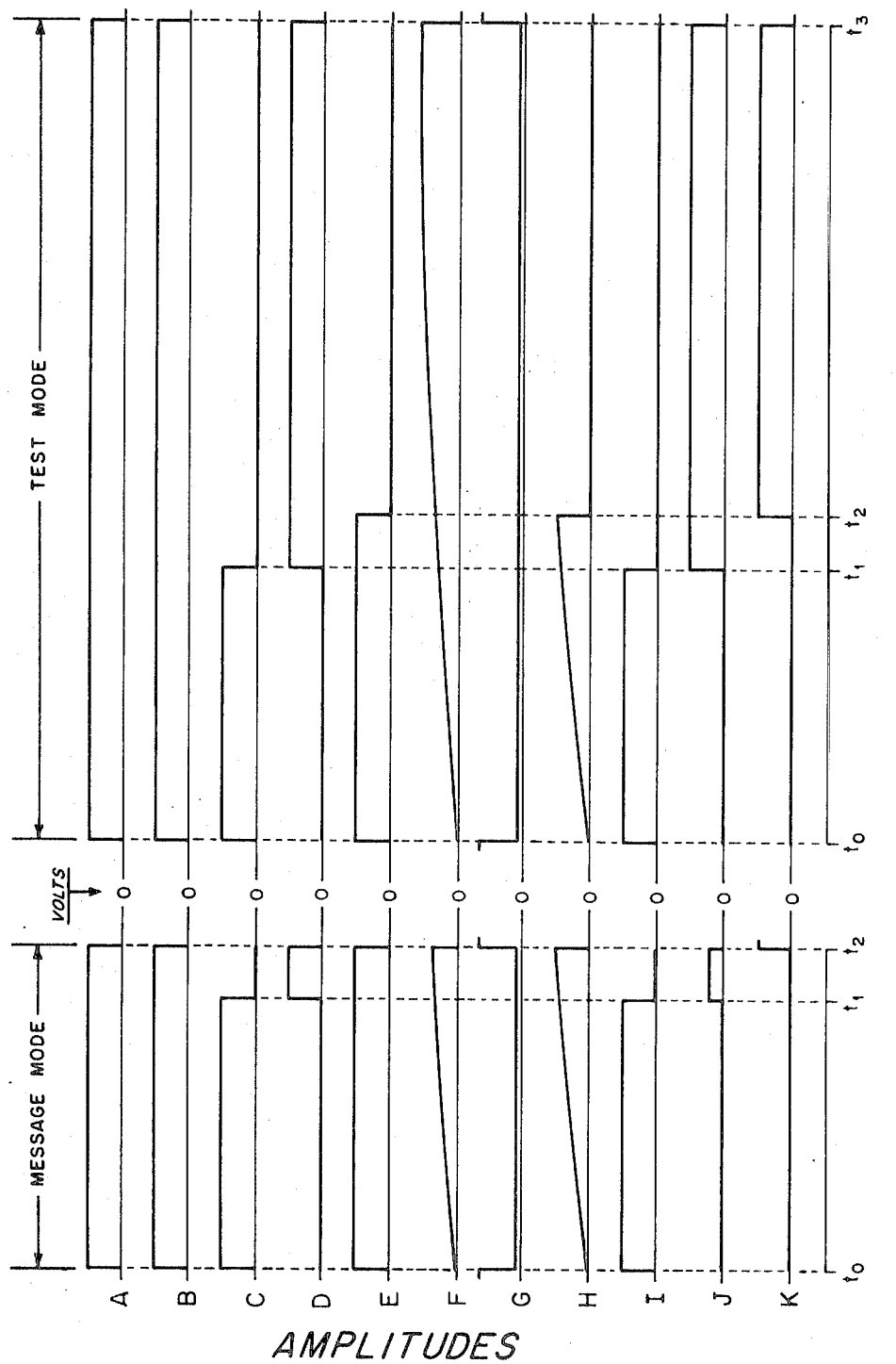

3,628,068

SEQUENTIAL TIMING SYSTEM

BACKGROUND OF THE INVENTION

The invention generally relates to switching systems, and more particularly to a system in which one of the primary considerations is the conservation of the primary power source.

In portable equipment it is generally desirable to conserve as much battery power as possible due to the life expectancy of such devices. In portable transmitting equipment such as MINI TALK II the device in which the invention is used, a two step operation is normally used. Normally a plurality of ON-OFF switches are used to activate the unit. The first switch usually powers the critical circuits such as voltage controlled oscillators, crystal oscillators and timers internal to the equipment. Generally these circuits require a stabilizing period before they will operate correctly. The second switch is used to turn on transmitter power and the modulating signal is initiated by additional means. While this type of system may be satisfactory for low power transmitting units it is not desirable for transmitters operating at high power. The device to which this switching system provides power is a state-of-the-art 30-watt transmitter and it is desirable to electronically control turn-on turnoff to conserve battery power.

SUMMARY OF THE INVENTION

Accordingly, it is the general purpose of the present invention to provide a solid state device that controls the application of battery power to a load. It is a further object to provide a device that controls the power timing to a plurality of loads so that each load receives an input power source for the minimum period of time that enables it to perform its function within the system.

This is obtained by providing a single ON-OFF switch which immediately connects power to the components of the system requiring the longest warmup period. The device then starts a timing cycle that provides power to different components after a fixed period of time. Upon receipt of a signal from the system receiving the power indicating that the operation is completed, all battery power is immediately shut off. In addition, the device provides a second timer whose function it is to shut down the battery power after a fixed period of time if due to some malfunction a return signal to shut down the system is not obtained. The system may be used with a load that has no means of providing a return signal to shut down the battery power as the second timer provides this function automatically after a fixed period of time.

BRIEF DESCRIPTION OF THE DRAWINGS

FIG. 3 is a diagram of voltage levels at specified points in the circuits of FIG. 1 and FIG. 2.

DESCRIPTION OF THE PREFERRED EMBODIMENT

Figure 1:
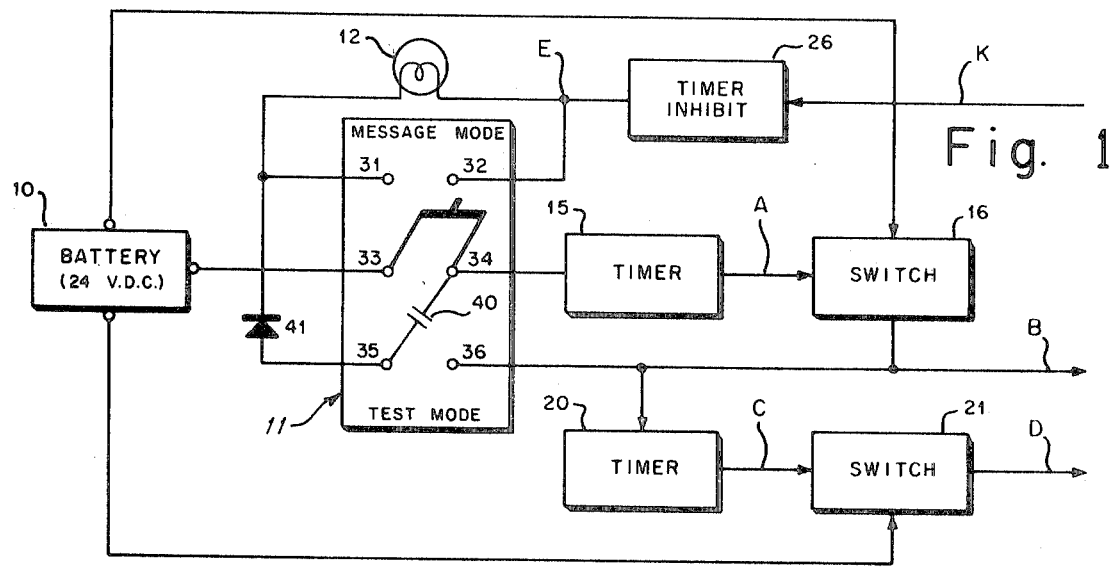
FIG. 1 is a schematic-block diagram of a preferred embodiment according to the present invention.

Referring now to FIG. 1 there is shown a battery 10 supplying voltage to a double-pole double-throw ON-OFF switch 11 with contact points 31, 32, 33, 34, 35 and 36. The contacts 31 and 32 on switch 11 are connected across an indicating light 12. Contact 34 of the switch is connected to a timer 15 whose output A is connected to transistor switch 16. Transistor switch 16 receives an additional input voltage directly from battery 10. The output B of transistor switch 16 is applied directly to a first load (not shown) which may comprise transmitter components such as logic timers, crystal oscillators, interfacing components, etc. The output of transistor switch 16 is also applied to contact 36 of switch 11 and in addition provides an input to timer 20. Timer 20 provides an output C to power switch 21. The power switch 21 also receives an input from battery 10. Power switch 21 provides an output D to a second load (not shown) such as a transmitter power amplifier.

Upon completion of its function the transmitter (not shown) provides an output signal that is applied to timer inhibit 26. The generation of this output signal in no way comprises a part of this invention but can be manually or automatically provided. In the present system automatic means are incorporated.

The timer inhibit 26 is connected to indicating light 12. A capacitor 40 is connected between contacts 34 and 35 of switch 11. A diode 41 is connected between contacts 31 and 35 of switch 11.

The operation of the device will now be described with reference to FIGS. 1 and 3. Upon switching component 11 to the message mode, the battery power is applied to timer 15 through indicating light 12. The output of timer 15, shown in FIG. 1 as A, switches on transistor switch 16 so that the transistor's individual supply of battery is switched through the output B. This power is supplied to a plurality of loads and its application is virtually instantaneous.

The signal B is also applied to a timer 20 that has an output signal C that provides a high-level output signal for a fixed period of a 0.5 seconds and at that time pulses to a ground signal. The power switch 21 on receipt of the ground signal from timer 20 switches its individual battery supply input from battery 10 to an output load. The output from switch 21 is denoted as D. Upon performing its function the load system transmits a signal to timer inhibit 26. Timer inhibit 26 provides a ground signal. The indicating light 12 is energized and a ground voltage is received at timer 15 which, in turn, inhibits transistor switch 16 by removing battery power from its output B. This in turn removes power from timer 20 to inhibit power switch 21 so that no power is received at D.

In the test mode, the input signal connected through switch 11 is pulsed through capacitor 40 energizing timer 15 which, in turn, energizes transistor switch 16. The battery supply 10 is then transmitted to transistor switch 16 output, that is shown as B. The battery voltage is applied to timer 20 and in addition through contacts 36 and 34 to provide a power supply to timer 15. The output of timer 20 turns on power switch 21 after a time delay of 0.5 seconds, as previously described, switching battery power through switch 20 to an output load. The timer inhibit signal has no effect on timer 15, since timer 15 is receiving power from switch 16 through contacts 36 and 34. Timer 15, therefore, runs for a full 1.5 seconds at the end of which timer 15 operates transistor switch 16 so that output B is switched off removing power from the system as previously described.

Figure 2:
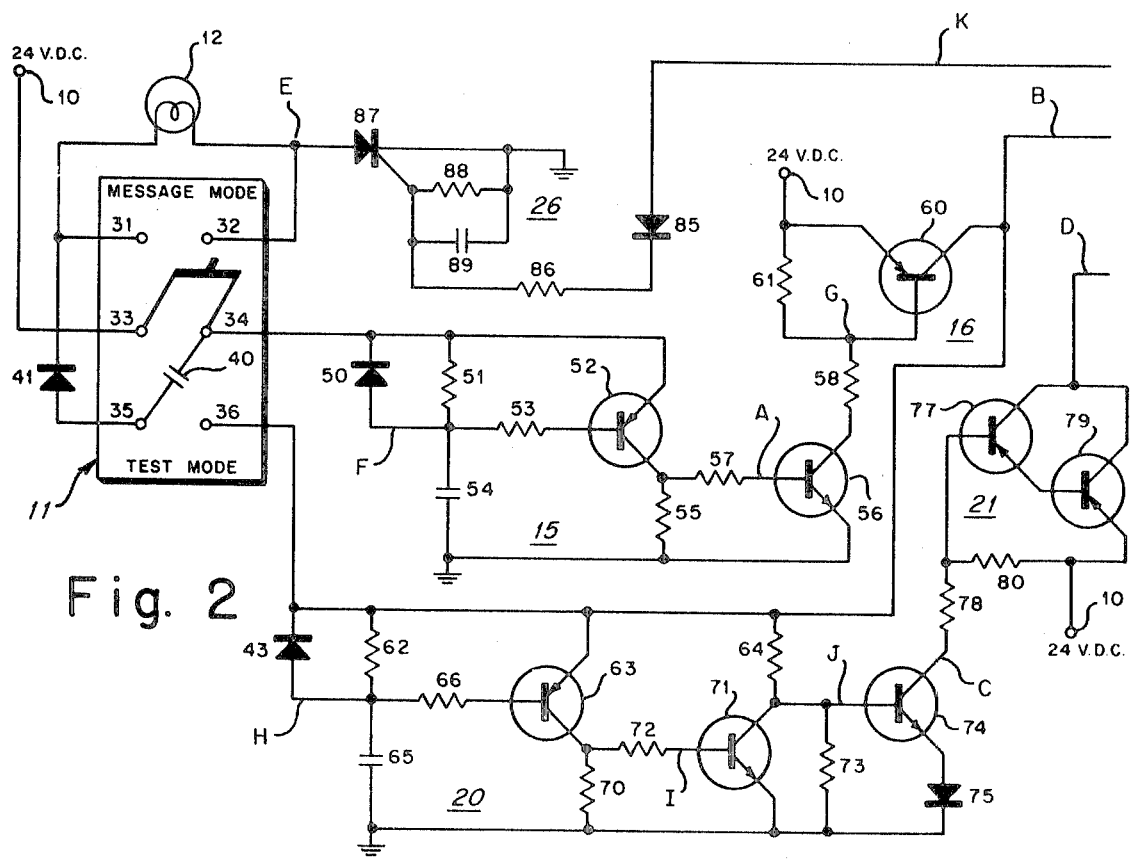
FIG. 2 is a more detailed schematic diagram of the embodiment of FIG. 1.

FIG. 2 shows the device in more detail with battery voltage 10 applied to contact 33 of switch 11. Indicating light 12 is connected between contacts 31 and 32. Contact 34 is connected to the cathode of diode 50 that is, in turn, in parallel with resistor 51. Also connected to contact 34 is the emitter of transistor 52. The other side of the parallel combination of diode 50 and resistor 51 are connected to resistor 53 and capacitor 54. The other contact of capacitor 54 is grounded. The other side of resistor 53 is connected to the base of transistor 52. The collector of transistor 52 is connected to ground through resistor 55. The base of transistor 56 is connected to the collector of transistor 52 through resistor 57. The emitter of transistor 56 is grounded. The collector of transistor 56 is connected to the base of transistor 60 of power switch 16 through resistor 58. Connected between the emitter and the base of transistor 60 is resistor 61. The battery supply 10 is connected to the emitter of transistor 60. The collector of transistor 60 provides an output voltage for a load (not shown) and in addition provides a DC voltage for contact 36 of switch 11, the cathode of diode 43, resistor 62, the emitter of transistor 63, and resistor 64. The anode of diode 43 is connected to ground through capacitor 65 and to the base of transistor 63 through resistor 66. The collector of transistor 63 is connected to ground through resistor 70 and to the base of transistor 71 through resistor 72. The emitter of transistor 71 is grounded. The collector of transistor 71 is connected to resistor 64, to ground through resistor 73, and directly coupled to the base of transistor 74. The emitter of transistor 74 is connected to ground through diode 75. The collector of transistor 74 is connected to the base of transistor 77 through resistor 78. The base of transistor 77 is connected to both the emitter of transistor 79 and to battery 10 through resistor 80. The base of transistor 79 is connected to the emitter of transistor 77. The collectors of transistors 77 and 79 are tied together and provide an output voltage D.

A return signal is provided to diode 85 in series with resistor 86. The other contact of resistor 86 is connected to the gate of silicon controlled rectifier 87. Connected between the gate of SCR 87 and ground are resistor 88 and capacitor 89. In addition, the cathode of SCR 87 is directly tied to ground. The anode of SCR 87 is serially connected to contact 32, indicating light 12, contact 31, diode 41 and contact 35. Connected between contacts 34 and 35 is capacitor 40 for use in the test mode.

The operation of the device will now be described with reference to FIGS. 2 and 3. With switch 11 in message mode the battery supply 10 provides voltage to timer 15 through indicating light 12. At the instant of applying the voltage, point F assumes ground potential and its voltage rise depends upon the capacitor 54 parameters. The voltage drop across resistor 51 places a bias between the emitter and base of transistor 52 that renders the transistor conductive. The voltage drop across resistor 55 then biases transistor 56 into the conducting state. The battery 10 applied to transistor switch 16 then has a current path through resistor 61, resistor 58, and transistor 56 to ground. The drop across resistor 61 biases transistor 60 into the conducting state so that an output voltage B is applied to both a load circuit and to timer 20.

Transistor 63 of timer 20 operates in a manner similar to transistor 52 of timer 15. A voltage drop is incurred across resistor 62 and point H assumes ground voltage the instant of application of battery voltage to timer 20. The voltage at point H then builds up in a manner similar to that at point F. The voltage drop across resistor 62 biases transistor 63 into a conducting state and a potential difference is then obtained across resistor 70 that biases transistor 71 into a conducting state. Point J then assumes a potential close to ground potential being connected to ground through conducting transistor 71. Transistor 74 therefore is nonconducting and point C assumes the full battery voltage from the battery supply to switch 21. Since there is no conduction in the switch at this time there is no voltage drop across resistor 80 and as a result transistors 77 and 79 are nonconductive so that there is no voltage output at point D. After a predetermined period of time, in this instance 0.5 seconds, point H rises to a sufficient voltage so that the voltage drop across resistor 62 is insufficient to bias transistor 63 into the conducting state. When transistor 63 shuts off point I loses its voltage potential, thereby shutting off transistor 71. Point J then obtains a voltage level through a voltage divider network comprising of resistors 64 and 73. This voltage biases transistor 74 into a conducting state so that point C is tied to ground through conducting transistor 74 and diode 75. This permits the battery voltage applied to switch 21 to have a current path through resistor 80, resistor 78, transistor 74, and diode 75 to ground. This voltage drop across resistor 80 biases both Darlington circuit transistors 77 and 79 into a conducting state so that the battery supply applied to power switch 21 has a path through transistor 79 to an output load (not shown). This point in the circuit is shown as point D.

After a period of time, in this case 20 milliseconds, a signal is received at diode 85 and is applied to the gate of SCR 87 through resistor 86. This renders SCR 87 conductive and the voltage applied to switch 11 has a current path through contact 31, indicating light 12 and SCR 87 to ground so that indicating light 12 is energized. Point F also assumes ground potential through diode 50, contacts 34 and 32, and SCR 87. This removes the battery voltage from timer 15 and renders transistors 52 and 56 nonconductive. At this time the battery power applied to transistor switch 16 no longer has a path to ground through transistor 56 and as a result there is no potential across the emitter-base electrodes of transistor 60. This shuts off transistor 60 and as a result point B loses its voltage potential. When the voltage is removed from point B, point J loses its biasing voltage and as a result transistor 74 is rendered nonconductive. Therefore, the battery voltage supply to switch 21 no longer has a current path through transistor 74 and as a result there is no potential drop across resistor 80 to bias Darlington circuit transistors 77 and 79. This shuts down transistors 77 and 79 therefore opening the current path to the output shown as point D. At this time it is clear that all use of battery power has been shut off save for indicating light 12 which consumes a very small amount of power.

If the system fails to receive a timer inhibit signal at diode 85 the voltage at point F would continue to rise until the voltage drop across resistor 51 is of insufficient magnitude to forward bias transistor 52. The remainder of the circuit would then operate as explained above and again power to the system would be shut down although no signal at the indicating light would be obtained.

The operation of the device in the test mode will now be explained. On placing switch 11 in the test mode, the battery 10 voltage supply to switch 11 provides a pulse to timer 15 through contacts 33, 35, capacitor 40, and contact 34. The voltage drop of this pulse across resistor 51 renders transistor 52 conductive which in turn, renders transistors 56 and 60 conductive as explained above. The signal at B is then applied to timer 20 and in addition supplies power through contacts 36 and 34 to timer 15. Timer 20 and switch 21 then operate as explained above.

Timer 15 continues to run until the voltage at point F is raised to a sufficient voltage level so that the drop across resistor 51 is not sufficient to keep transistor 52 operating. This, in turn, inhibits transistors 56 and 60 so that the output of point B is inhibited. This removes the voltage from point J inhibiting transistor 74. The voltage applied to switch 21 has no current path through transistor 74 and as a result there is no voltage drop across resistor 80. This opens both transistors 77 and 79 so that the voltage is inhibited to point D. In this way it is shown that the device can be operated in the test mode and is not dependent upon a return signal from the load in order to shut down after a predetermined period of time.

It has therefore been shown a system in which power can be preserved by providing battery voltage to a selective load for a period of time so that the components may settle out before applying power to additional components in the system. The system further provides a means whereby it shuts down instantaneously upon receipt of a command signal that indicates power is no longer required.

Additionally the device will automatically shut down battery voltage after a predetermined period of time whether or not a command signal is received. Such a device is usable not only in the present system but in many systems that require only part of the control circuitry available from this device or whose time intervals vary from the present invention.

Obviously, many modifications and variations of the present invention are possible in the light of the above teachings. It is therefore to be understood that within the scope of the appended claims the invention may be practiced otherwise than as specifically described.

What is claimed is:

1. A sequential timing system comprising:
   first switching means for supplying a first current path for a first electrical signal upon being actuated;
   first timing means connected to receive said first electrical signal and for being instantaneously actuated for a fixed predetermined maximum period of time upon receipt of said signal;
   second switching means electrically connected to said first timing means for supplying a current path for a second electrical signal upon said first timing means being actuated;
   second timing means connected to receive said second electrical signal and for providing a time delayed actuation in response to receipt of said second electrical signal;

third switching means electrically connected to said second timing means for supplying a third current path for a third electrical signal upon said timing means being actuated; and fourth switching means connected to receive a command signal for inhibiting said first, second and third current paths.

2. A sequential timing system according to claim 1 wherein:

said first switching means further includes a first and second pole; and an impedance electrically connecting said first and second poles.

3. A sequential timing system according to claim 2 wherein said first timing means further comprises:

a varying voltage divider network receiving said first electrical signal and providing a varying voltage output;

a first transistor having a base, emitter and collector, said base receiving said first varying voltage output for initially rendering said first transistor conductive; and a second transistor operatively connected to said first transistor and being biased into a conducting state upon said first transistor becoming conductive.

4. A sequential timing system according to claim 3 further comprising:

said first transistor is an NPN-type;

said second transistor is a PNP-type; and said varying voltage divider network includes a resistor and capacitor connected in series.

5. A sequential timing system according to claim 4 wherein said second switching means further comprises:

a third transistor including an emitter, collector and base for providing a current path from said emitter to said collector; and a resistor connected between said emitter and base for providing a bias voltage to said third transistor upon said second transistor becoming conductive.

6. A timing system comprising:

timing means for instantaneously providing an output signal for a fixed predetermined maximum period of time upon receipt of a first electrical signal having a varying voltage divider network receiving said first electrical signal and providing a varying output, a first transistor having a base, emitter and collector receiving said varying voltage for initially rendering said first transistor conductive, and a second transistor operatively connected to said first transistor for providing said output signal upon said first transistor becoming conductive; and switching means having a third transistor including an emitter, collector and base connected to receive said output signal for providing a current path from said emitter to said collector for a second electrical signal upon receipt of said output signal and to inhibit said second electrical signal in the absence of said output signal and a resistor connected between said emitter and base for providing a bias voltage to said third transistor upon said second transistor becoming conductive.

7. A timing system comprising:

timing means for providing a current path after a fixed predetermined period of time having a varying voltage divider network connected to receive a first electrical signal and providing an output voltage that varies as a function of time, a first transistor having a base, emitter and collector receiving said output voltage for initially rendering said first transistor conductive and for further rendering said first transistor nonconductive upon said output voltage exceeding a predetermined magnitude after a fixed period of time, a second transistor operatively connected to said first transistor for being biased into a conducting state when said first transistor becomes conductive and becoming nonconductive when said first transistor becomes nonconductive and a third transistor operatively connected to said second transistor for being biased into a nonconducting state when said second transistor becomes conductive and for being biased into a conducting state when said second transistor becomes nonconductive and switching means having a first input connected to said third transistor and a second output connected to receive a second electrical signal for providing a current path to said second electrical signal upon said third transistor being conductive.

8. A timing system according to claim 7 wherein said switching means further comprises:

transistor means including a Darlington circuit connected to receive a second electrical signal and for providing a current path for said second electrical signal; and a resistor connected to said transistor means for providing a bias voltage to said transistor means upon said third transistor being conductive.

* * * * *